(12) United States Patent
Avouris et al.

(10) Patent No.: US 9,335,471 B2
(45) Date of Patent: May 10, 2016

(54) GRAPHENE PLASMONIC COMMUNICATION LINK

(71) Applicant: INTERNATIONAL BUSINESS MACHINES CORPORATION, Armonk, NY (US)

(72) Inventors: Phaedon Avouris, Yorktown Heights, NY (US); Vasili Perebeinos, Yorktown Heights, NY (US); Mathias B. Steiner, New York, NY (US); Alberto Valdes Garcia, Hartsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/821,179

(22) Filed: Aug. 7, 2015

(65) Prior Publication Data

US 2015/0346428 A1    Dec. 3, 2015

Related U.S. Application Data

(63) Continuation of application No. 13/790,830, filed on Mar. 8, 2013, now Pat. No. 9,134,481.

(51) Int. Cl.
  *G02B 6/26* (2006.01)
  *G02B 6/122* (2006.01)
  *H04B 10/80* (2013.01)
  *H04B 10/90* (2013.01)

(52) U.S. Cl.
  CPC .............. *G02B 6/1226* (2013.01); *G02B 6/262* (2013.01); *H04B 10/802* (2013.01); *G02F 2203/10* (2013.01); *G02F 2203/13* (2013.01); *H04B 10/90* (2013.01)

(58) Field of Classification Search
  None
  See application file for complete search history.

(56) References Cited

U.S. PATENT DOCUMENTS

| 4,765,705 | A | 8/1988 | Seymour et al. | |
|---|---|---|---|---|
| 6,408,123 | B1 | 6/2002 | Kuroda et al. | |
| 6,967,347 | B2 * | 11/2005 | Estes | B82Y 10/00 |
| | | | | 257/25 |
| 7,583,882 | B2 | 9/2009 | Guo | |
| 7,995,879 | B2 | 8/2011 | Bowers et al. | |
| 9,134,481 | B2 * | 9/2015 | Avouris | G02B 6/262 |
| 2007/0223940 | A1 | 9/2007 | Smolyaninov et al. | |
| 2010/0126567 | A1 | 5/2010 | Kaufman | |
| 2010/0158445 | A1 | 6/2010 | Kim et al. | |
| 2011/0186818 | A1 * | 8/2011 | Bowers | H01L 29/12 |
| | | | | 257/29 |
| 2011/0285999 | A1 | 11/2011 | Kim et al. | |
| 2013/0071083 | A1 | 3/2013 | Kim | |
| 2014/0105553 | A1 * | 4/2014 | Kim | G02F 1/011 |
| | | | | 385/123 |

OTHER PUBLICATIONS

Bao, Q., et al. "Graphene Photonics, Plasmonics, and Broadband Optoelectric Devices" ACS Nano, vol. 6, No. 5. Apr. 2012. pp. 3677-3694.

(Continued)

*Primary Examiner* — Sung Pak
(74) *Attorney, Agent, or Firm* — Tutunjian & Bitetto, P.C.; Vazken Alexanian

(57) ABSTRACT

A signal transfer link includes a first plasmonic coupler, and a second plasmonic coupler spaced apart from the first plasmonic coupler to form a gap. An insulator layer is formed over end portions of the first and second plasmonic couplers and in and over the gap. A plasmonic conductive layer is formed over the gap on the insulator layer to excite plasmons to provide signal transmission between the first and second plasmonic couplers.

18 Claims, 6 Drawing Sheets

(56) References Cited

OTHER PUBLICATIONS

Kinzel, E., et al. "High efficiency excitation of plasmonic waveguides with vertically integrated resonant bowtie apertures" Optics Express, vol. 17, No. 10. May 2009. (10 pages).

Rana, F. "Graphene Terahertz Plasmon oscillators" IEE Transactions on Nanotechnology, vol. 7, No. 1. Jan. 2008. pp. 91-99.

Yaacobi, A., et al. "Veritcal emitting aperture nanoantennas" Optics Letters, vol. 37, No. 9. May 2012. pp. 1454-1456.

Won, H.S., et al. "Vertical coupling of long-range surface plasmon polaritons" Applied Physics Letters, vol. 88, 011110. Jan. 2006. (4 pages).

Grigorenko, A.N., et al. "Graphene Plasmonics," Nature Photonics, vol. 6. Nov. 2012, pp. 749-758.

Avouris, B., et al. "Graphene Plasmonic Communication Link," Office Action Mailed for U.S. Appl. No. 13/969,129 mailed on Jun. 9, 2014. (6 pages).

Barnes, W., et al. "Surface Plasmon Subwavelength Optics" Nature, Vol. 424. Aug. 2003. pp. 824-830.

Gomez-Diaz, J., et al. "Graphene-Based Plasmonic Switches At Near Infrared Frequencies" Mesoscale and Nanoscale Physics (cond-mat. mes-hall); Optics (physics.optics). Feb. 2013. (14 pages).

Gramotnev, D., et al. "Plasmonics Beyond the Diffraction Limit" Nature Photonics, vol. 4. Feb. 2010. pp. 83-91.

Hewitt, J. "Samsung Finds Graphene Antenna Project for Wireless, Ultra-Fast Intra-Chip Links" Ziff Davis, Inc. Feb. 2013. Available at: http://www.extremetech.com/extreme/149172-sarnsung-funds-graphene-antenna-project-for-wireless-ultra-fast-intra-chip-links(2 Pages ).

Jornet, J. "Terahertz Communications for Graphene-Based Nano-Devices" IEEE P802.15 Working Group for Wireless Personal Area Networks (WPANs). Nov. 2010. (39 pages).

Llatser, I., et al, "Characterization of Graphene-Based Nano-Antennas in the Terahertz Band" Proceedings of the Sixth European Conference on Antennas and Propagation. Mar. 2012. pp. 194-198.

Mikhailov, S. "Graphene Based Terahertz Emitter" International Conference—Graphene 2012. Apr. 2012. (1 page).

Nikitin, A., et al. "Edge and Waveguide Terahertz Surface Plasmon Modes in Graphene Microribbons" Physical Review, vol. 84. Oct. 2011. pp. 1-4.

Rana, F., et al. "Graphene Plasmonics for Subwavelength Terahertz Oscillators" Annual Meeting of the IEEE Photonics Society (LEOS 2009). Oct. (2009). pp. 650-651.

Renger, J., et al. "Direct Excitation of Surface Plasmon Polaritons in Nanopatterned Metal Surfaces and Thin Films" Physical Review, vol. 76. Jul. 2007. pp. 1-7.

Williams, C., et al. "Highly Confined Guiding of Terahertz Surface Plasmon Polaritons on Structured Metal Surfaces" Nature Photonics, vol. 2. Mar. 2008. pp. 175-179.

Zayats, A., et al. "Nano-Optics of Surface Plasmon Polaritons" Phsyics Reports, vol. 408. Nov. 2004. pp. 131-314.

\* cited by examiner

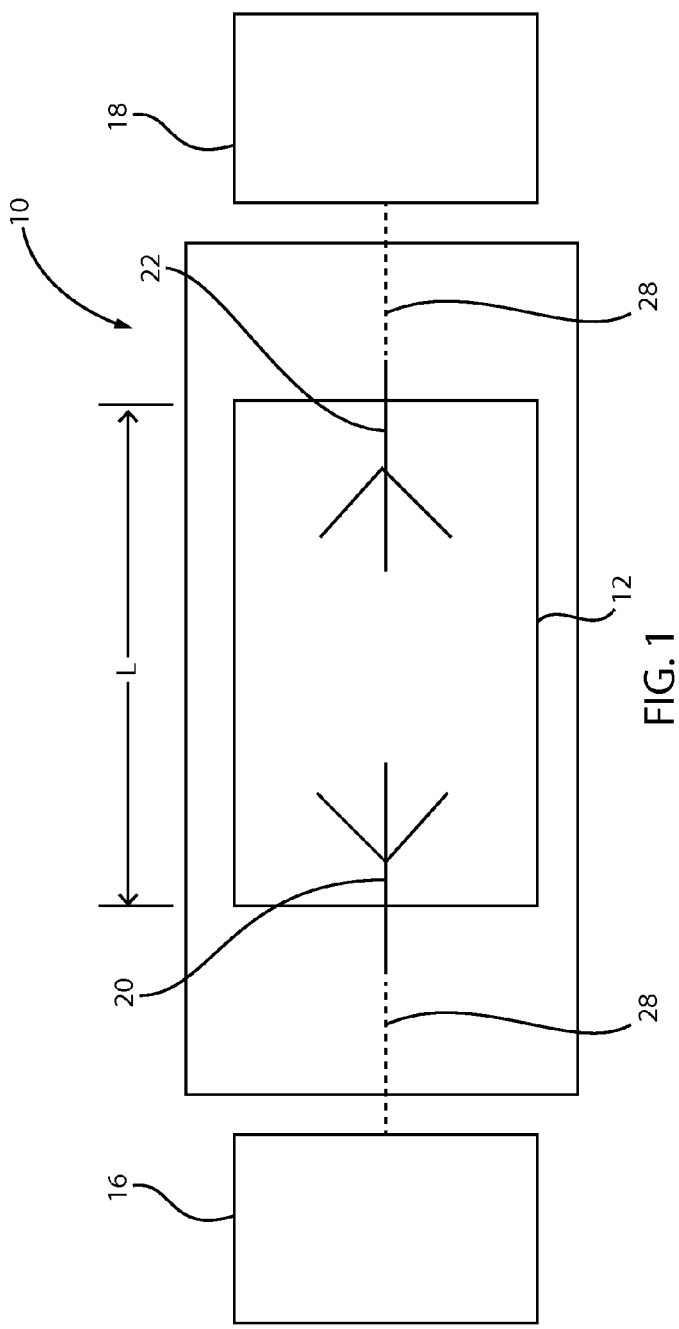
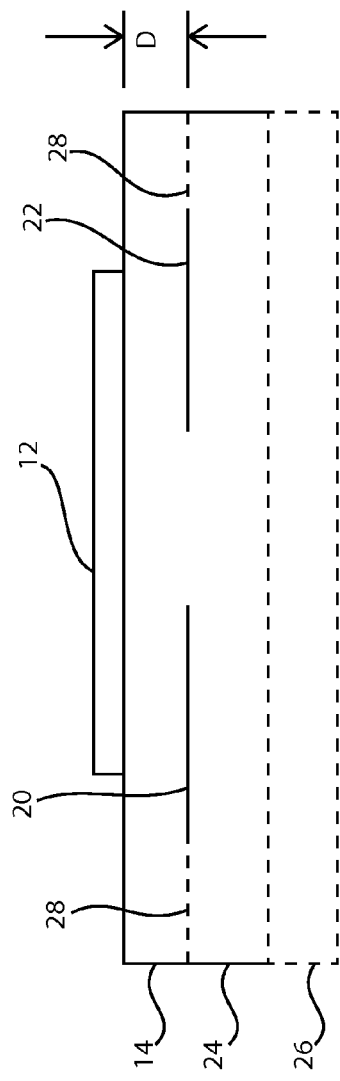
FIG. 1
FIG. 2

GRAPHENE PLASMONIC COMMUNICATION LINK

RELATED APPLICATION DATA

This application is a Continuation application of co-pending U.S. patent application Ser. No. 13/790,830 filed on Mar. 8, 2013, incorporated herein by reference in its entirety.

BACKGROUND

1. Technical Field

The present invention relates to communication links, and more particularly to inter- and intra-integrated circuit chip communication using graphene plasmonic communication links.

2. Description of the Related Art

Electromagnetic communication between components of a system at high frequencies is a fundamental requirement for the advancement of high-performance computing and the information technology (IT) industry. The higher the carrier frequency of an electrical signal, the more bandwidth is available, which translates into a larger amount of information that can be transferred.

Current commercial communication systems operate at frequencies below 80 GHz. For signal frequencies above a few 100 GHz, the AC current in a metal wire is subject to strong damping, and losses associated with signal progression limit the use of communication methods that rely on electrical transport. An alternative method is using antenna systems attached to system components that communicate wirelessly through emission and detection of electromagnetic radiation. For multiple closely spaced transmitter-receiver systems, however, the interference (cross-talk) between the different signals deteriorates the overall performance and limits practical applications. Moreover, although the dimensions of an antenna are inversely proportional to its optimum radiating frequency, even at 200 GHz, typical antenna dimensions would be of the order of tens of millimeters. This is a very large form factor taking into account that a microprocessor would fit in the same dimensions.

SUMMARY

A signal transfer link includes a first plasmonic coupler, and a second plasmonic coupler spaced apart from the first plasmonic coupler to form a gap. An insulator layer is formed over end portions of the first and second plasmonic couplers and over the gap. A plasmonic conductive layer is formed in and over the gap on the insulator layer to excite plasmons to provide signal transmission between the first and second plasmonic couplers.

A signal transfer link includes a first plasmonic coupler, a second plasmonic coupler disposed in a same plane as the first plasmonic coupler and spaced apart from the first plasmonic coupler by a gap and an insulator layer formed over end portions of the first and second plasmonic couplers and in and over the gap. The insulator has a thickness configured to prevent electrical connection between the first and second plasmonic couplers. A plasmonic conductive layer includes graphene formed over the gap on the insulator layer and overlaps the end portions of the first and second plasmonic couplers such that an electrical signal from one of the first and second plasmonic couplers is converted to a plasmonic signal in the plasmonic conductive layer, which is then converted back to an electrical signal in the other of the first and second plasmonic couplers.

A method for high frequency signal transfer includes providing a plasmonic signal transfer link including a first plasmonic coupler, a second plasmonic coupler spaced apart from the first plasmonic coupler to form a gap, an insulator layer formed over end portions of the first and second plasmonic couplers and in and over the gap, and a plasmonic conductive layer formed over the gap on the insulator layer to excite plasmons to provide signal transmission between the first and second plasmonic couplers; and signaling between a first component coupled to the first plasmonic coupler and a second component coupled to the second plasmonic coupler at a frequency between about 100 GHz and 10 THz.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a top view of a plasmonic link in accordance with the present principles;

FIG. 2 is a side cross-sectional view of the plasmonic link of FIG. 1 in accordance with the present principles;

DETAILED DESCRIPTION

Figure 3:
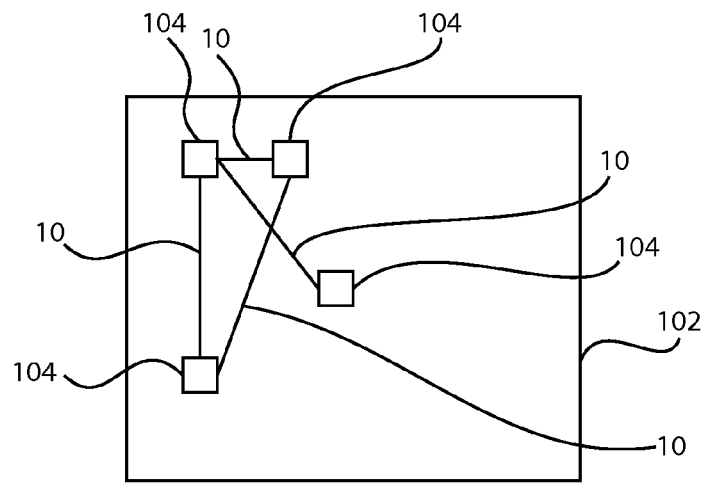
FIG. 3 is a top view of an integrated circuit having one or more plasmonic links between components of an integrated circuit in accordance with one embodiment.

In accordance with the present principles, a plasmon-based communication link is provided that overcomes the limitations of the prior art. The plasmon-based communication link includes a non-radiative, plasmon-mediated signal transport mechanism that neither relies on electrical transport nor on far-field radiation electromagnetic waves. The plasmon-mediated communication channel permits signal transmission at Terahertz frequencies. The plasmon-based communication link as described herein is particularly useful in intra-chip and inter-chip communications, although the present principles are applicable to any communication link or system.

In one example, a layer (or few layers) of graphene form a mono-atomic carbon layer, for plasmon-mediated inter-systems communications. Plasmons are collective excitations of charge carriers in graphene, and are excited at one end of the graphene-based plasmonic link by a plasmon launcher (e.g., a plasmon coupler or plasmon antenna) attached to a first system component. The launched plasmons propagate along the graphene sheet and are converted back into a conventional AC electrical signal by a second plasmon coupler attached to a second system component. As a result, the first and second system components are linked by plasmon-based communication. Unlike conventional waveguides, the graphene-based plasmon link permits confinement of an electromagnetic signal on a length scale much smaller than a wavelength of electromagnetic radiation in free space. This enables fast, high-bandwidth communication and low losses.

As will be appreciated by one skilled in the art, aspects of the present invention may be embodied as a communication link between chips, between components on a same chip or between other components and/or chips. It is to be understood that the present invention will be described in terms of an illustrative architecture or structure; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present principles may be implemented as an integrated circuit chip. A design for an integrated circuit chip may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips or similar devices. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip may then be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced communication devices or computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a top view of an illustrative plasmon-based communication link 10 is shown in accordance with one embodiment. A plasmon conductive layer 12 may include graphene, e.g., one or more layers of graphene, or a metal grating. The layer 12 is deposited, formed or placed on top of a thin insulator 14 (e.g., a thermal oxide, high-k dielectric, or plastic, e.g., PMMA). The insulator 14 acts as a spacer between chip or system components 16, 18 and the plasmon-based communication link 10 to prevent direct electrical contact between the components 16, 18. The layer 12 spatially overlaps with two (or more) plasmon couplers, or nano-antennas 20, 22. Each of the plasmon couplers or nano-antennas 20, 22 is connected to different chip or system components 16, 18.

Referring to FIG. 2, with continued reference to FIG. 1, a distance D between the layer 12 and the plasmon couplers 20, 22 includes a thickness of the insulator 14. The structure depicted in FIGS. 1 and 2 may be formed on one or more chips or be formed on its own carrier or substrate. A first insulator 24, e.g., an oxide, nitride, plastic, etc. may optionally be formed on a substrate or other carrier 26. A metal layer or layers (or other conductive material) is deposited on the insulator 24 or 14 and patterned to form plasmon couplers 20, 22 or nano-antennae. The plasmon couplers 20, 22 and connections 28 between components 16, 18 are preferably included in a single layer, although multiple layers may be employed and the layers may or may not be coplanar for respective plasmonic couplers (although plasmon couplers 20, 22 are shown to be coplanar). Next, insulator 14 is formed over the plasmon couplers 20, 22. The insulator 14 has a thickness D, which is on the order of a few tens of nanometers (e.g., much smaller than the wavelength of the AC signal) to promote an efficient near field energy transfer between the plasmon couplers 20, 22 and the graphene layer 12. In one embodiment, the thickness D is between about 5 nm and 40 nm.

Charge carrier oscillations in the system component 16 and plasmon coupler 20 are employed to excite plasmons in the layer 12 (e.g., graphene layer) that propagate along the layer 12. Due to the spatial overlap with plasmon coupler 22, a signal will be converted back from a plasmonic signal into an AC electrical signal and propagate to system component 18 through the plasmon coupler 22. Similarly, a thin layer of metal (instead of the graphene layer) may be employed if a thickness, mechanical flexibility, and optical transparency in the visible range are not critical for a specific application.

Due to mismatches between the wavelengths of radiation (e.g., light) and surface plasmons, light illuminating a metal surface cannot directly couple to surface plasmon polaritons. To overcome this, a grating or patterning of the metal can be provided to break the translational invariance. A typical length scale for the grating is determined by the wavelength, and, in the visible range, it falls on a length scale of a few tenths of a nanometer. However, in the THz frequency range the corresponding length scale increases to microns, which is a comparable size of a single domain in graphene samples. Therefore, momentum conservation bottlenecks are relaxed at high frequencies (with larger lengths/gratings). In addition, due to the small distance (compared to the wavelength) between a THz source and graphene, plasmon launching is from near field radiation. This also favors coupling efficiency as compared with far field illumination applications. Due to many parameters, plasmon launching efficiency for a given application needs careful modeling to be optimized.

To be a useful communication link, the layer 12 needs to enable plasmon propagation on a length scale that is relevant for a particular system technology. The propagation length of plasmons in graphene is determined by losses associated with the collective charge carrier oscillation. Based on the standard Drude model, an estimate of the plasmon decay length can be determined. Losses, of e.g., 20 dB, occur in graphene plasmon links at a length L that is 4.6 times as large as the plasmon decay length. For realistic carrier mobilities of, e.g., 1,000 $cm^2/Vs$ to 10,000 $cm^2/Vs$ and carrier densities of, e.g., $10^{12}$ $cm^{-2}$ to $10^{13}$ $cm^{-2}$, the plasmon decay length $\lambda_2$ (defined as $$\lambda_2 = \frac{1}{2q_2} \propto v^{-1},$$

where $q_2$ is an imaginary part of the plasmon wavevector) in a monolayer graphene varies between 0.24 microns and 24 microns at a frequency v=1 THz, while the plasmon decay length lies between 2.4 microns and 240 microns at v=100 GHz. In structures made of multiple graphene layers, the plasmon decay length is proportionally increased with the number of layers.

As a result, a graphene-based plasmonic communication link 10 enables communication between system components that are spaced by microns to millimeters at Terahertz frequencies. The efficiency of plasmon excitation and conversion in the graphene communication link 10 depends on frequency, geometrical layout of the plasmon couplers 20, 22, and electronic properties of the materials employed. The graphene communication link 10 is engineered for each specific application.

Referring to FIG. 3, an integrated circuit chip 102 is illustratively shown including one or more graphene-based communication links 10 thereon. It should be understood that the links 10 may be formed during the processing and fabrication of the chip 102. Graphene layers 12 may be formed by one or more processes. For example, graphene material may be formed using a chemical vapor deposited (CVD) process, an epitaxial growth process, a solution based deposition process (dipping), a mechanically exfoliation process (transferred layer), etc. The process by which graphene is formed may vary with the material on which the graphene is formed, cost constraints and/or other factors. For example, a mechanically exfoliated or CVD grown graphene can be deposited on an oxide layer (14). Alternatively, epitaxially grown graphene may be provided on a silicon carbide substrate followed by the formation of the insulator layer 14, plasmon couplers and then another insulator layer.

The integrated circuit chip 102 may employ the links 10 for high speed, high bandwidth communication between chip components 104. The components may include processing devices, logic gates, memory arrays, etc. In one embodiment the links may be stacked to increase a number of connections.

For applications that rely on three-dimensional-stacking of chip or levels, the deployment of suitable shielding layers between the chip levels may be employed to reduce signal interference and cross-talk caused by far field radiation emitted at plasmon launchers/couplers (e.g., couplers 20, 22 of FIG. 1). A vertical stacking height, H, (shown in FIG. 5) (between plasmon launchers/couplers in different levels) has to be larger than the plasmon confinement length $\lambda_1$ to avoid plasmon losses by shielding layers. The plasmon confinement length $\lambda_1$ (defined as $$\lambda_1 = \frac{1}{q_1} \propto v^{-2},$$

where $q_1$ is a real part of the plasmon wavevector) depends only on the carrier density, unlike the plasmon decay length which depends on both carrier density and mobility. For carrier densities of $10^{12}$ $cm^{-2}$ to $10^{13}$ $cm^{-2}$, $\lambda_1$ varies between 6.6 microns and 20.7 microns at a frequency v=1 THz, while it ranges from 660 microns to 2 mm at v=100 GHz.

Figure 4:
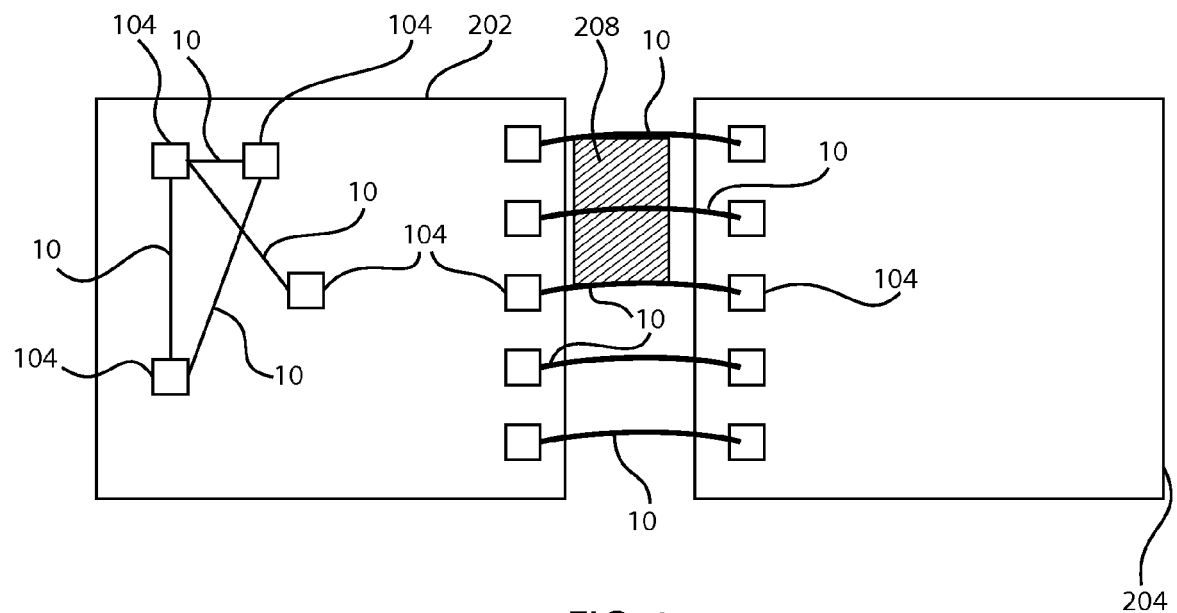
FIG. 4 is a top view of two integrated circuit chips having one or more plasmonic links between the chips in accordance with another embodiment.

Referring to FIG. 4, another embodiment shows a system 200 with one or more graphene-based communication links 10 between integrated circuit chips 202 and 204. It should be understood that the links may be employed between components on the chips 202 and 204 as well (see, chip 202 and FIG. 3). The system 200 includes multiple parallel communication links 10 between chips 202 and 204. The chips 202 and 204 may include systems on chip (SOC) devices, although any integrated circuit may be employed. The links 10 may include flexible media (e.g., plastic) and may include single links, or the links may be grouped on a ribbon or common material 208.

In one embodiment, the chips 202 and 204 are secured to a substrate or printed wiring board. The end portions of the links include conductive material to form plasmon couplers (or nano-antennae). The conductive material of the couplers connects a graphene layer (as shown in FIG. 1) to form the link. As with the other embodiments, the plasmonic link 10 is based on a single conductor through the link 10. The single conductor provides less cross-talk potential then, e.g., conventional transmission lines, which always employ at least two conductors, one for signal and one for ground for return current. The plasmonic link 10 also confines energy within small dimensions; as opposed to antennas for transmission lines that radiate in many directions and cannot be completely isolated from each other especially if they are placed in close proximity.

In particularly useful embodiments, the plasmonic link 10 can be made thin (e.g., less than 50 nm), can be made flexible (using thin material and plastic or other flexible substrates), and can be made transparent in the visible spectrum (due to material choice and small thickness). Multiple plasmonic links 10 can be placed in parallel with a flexible form factor as depicted, e.g., in FIG. 4. These features are not available in conventional transmission lines and communication links.

Figure 5:
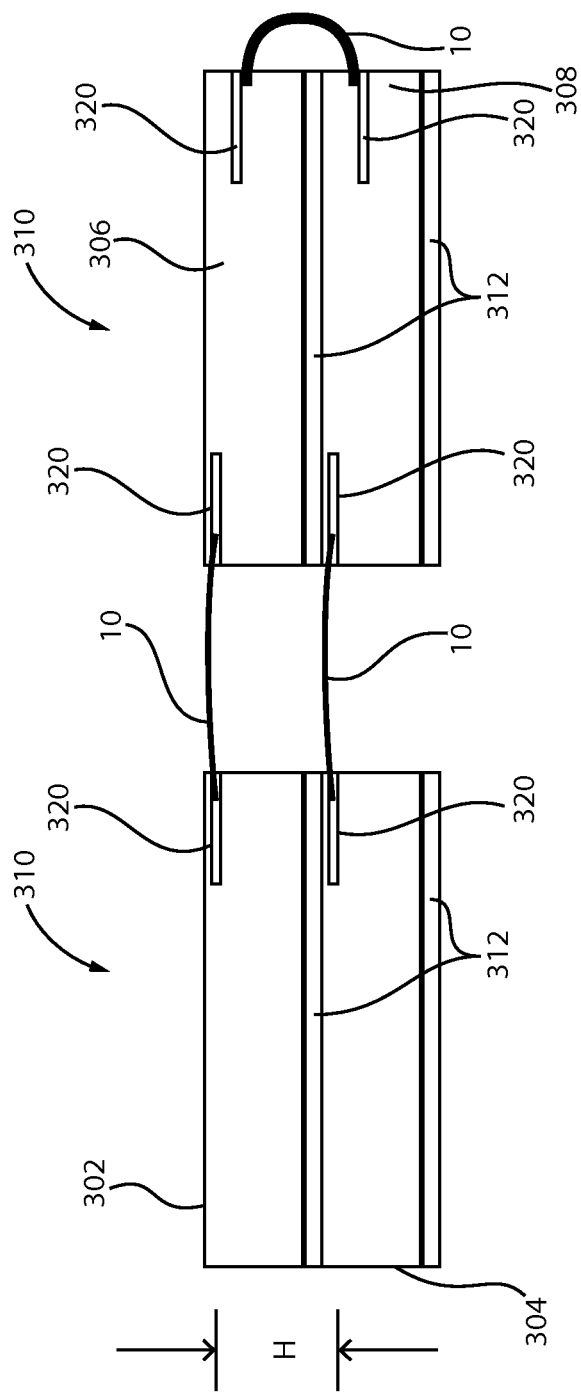
FIG. 5 is a side view of two stacks of an integrated circuit chips showing plasmonic links between chips in a same vertical stack and between chips in different stacks in accordance with another embodiment.

Referring to FIG. 5, in addition, to provide links between horizontally disposed chips (FIG. 4), links 10 may be provided between vertically disposed chips 302, 304, 306, 308 and/or stacks 310 of chips. The links 10 may be employed to connect chips 306, 308 in a same stack 310 or to connect chips 302, 306 and 304, 308, respectively, in different stacks 310 or any combination thereof.

For applications that rely on three-dimensional-stacking of chip levels, the deployment of suitable shielding layers 312 between the chip levels may be employed to reduce signal interference and cross-talk caused by far field radiation emitted at the plasmon launchers/couplers 320 (which are the same or similar to couplers 20, 22 of FIG. 1). The vertical stacking height, H, (between plasmon launchers/couplers 320 in different levels) has to be larger than the plasmon confinement length $\lambda_1$ to avoid plasmon losses by the shielding layers 312. The plasmon confinement length $\lambda_1$ (defined as $$\lambda_1 = \frac{1}{q_1} \propto v^{-2},$$

where $q_1$ is a real part of the plasmon wavevector) depends only on the carrier density, unlike the plasmon decay length which depends on both carrier density and mobility. For carrier densities of $10^{12}$ cm$^{-2}$ to $10^{13}$ cm$^{-2}$, $\lambda_1$ varies between 6.6 microns and 20.7 microns at a frequency $v=1$ THz while it ranges from 660 microns to 2 mm at $v=100$ GHz.

Figure 6:
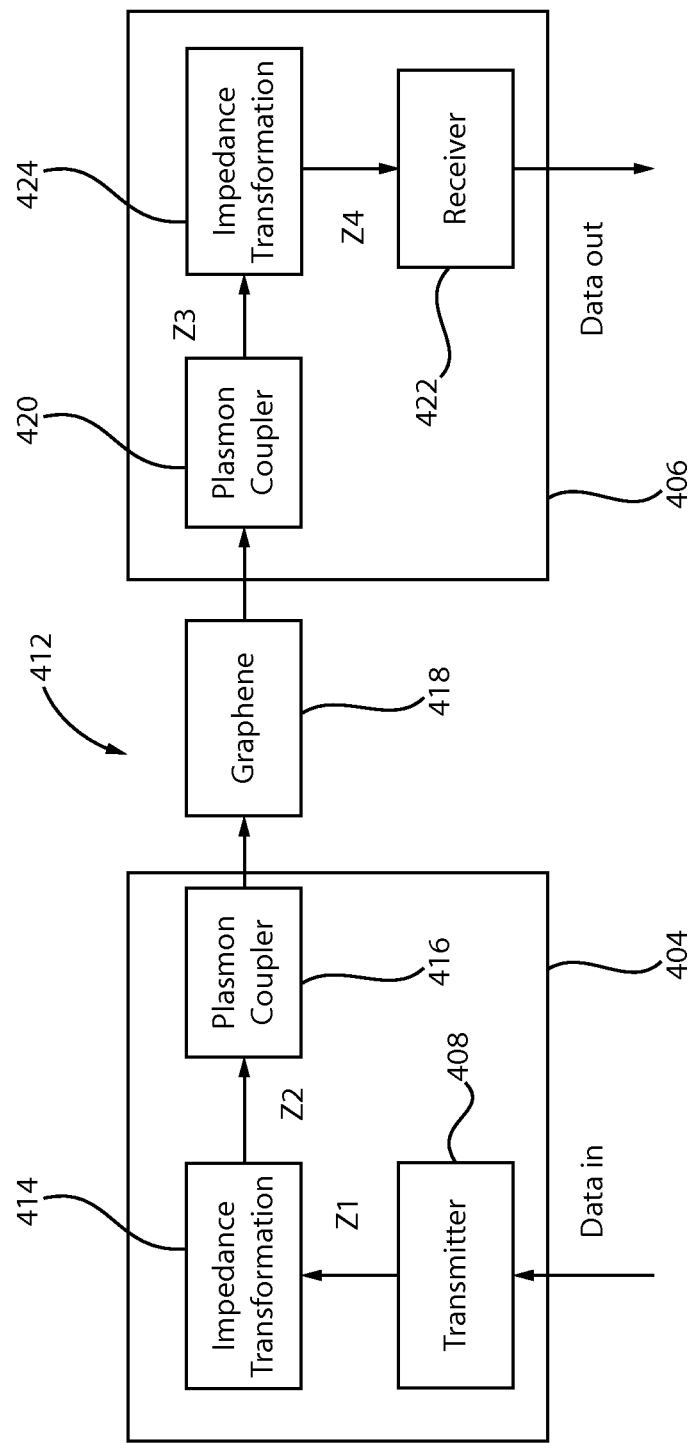
FIG. 6 is a block/flow diagram showing two integrated circuit chips having a plasmonic link and impedance transformation between a data source (transmitter) and the link and between a data sink (receiver) and the link in accordance with another embodiment.

Referring to FIG. 6, a block diagram shows an illustrative implementation of a plasmonic communication link 412 between two chips 404 and 406. Chip 404 includes a transmitter 408, which receives data (Data in), which is loaded by an impedance Z1. Impedance Z1 is optimized for THz transmission. However, the Z1 impedance may not be optimal for plasmonic communication across a plasmonic medium/link 412. An impedance network or transformation module 414 transforms the electrical impedance Z1 to an impedance Z2 for communication across the link 412. The link includes a plasmon coupler 416 and a graphene layer or layers 418 configured to permit plasmonic communication to plasmonic coupler 420 on chip 406. An impedance Z3 is configured for optimal coupling. Chip 406 includes a receiver 422, which may need a different impedance (Z4) to efficiently output data (Data out). This may also be handled using an impedance transformation network 424, which is configured to transform impedance Z3 to Z4 to ensure the best performance for information transfer between the chips 404 and 406.

It should be understood that the transmission speeds for the communication link 412 and the transmission source (408) and receiver (422) may be in the GHz range or the THz range, e.g., 10 GHz-10 THz, although other speeds are contemplated. Further, impedance transformation networks or circuits may be active or passive and may include known transformation circuitry. As with all the embodiments described herein the plasmonic link 412 is based on a single conductive path between couplers and graphene (or metal). The single conductive path preferably does not include any type of semiconductor junction (p-n junction) and confines transmitted energy within the very small dimensions of the link. The plasmonic link 412 is thin and flexible, and transparent (if graphene is employed). As before, multiple plasmonic links can be placed in parallel across the chips 404 and 406.

Figure 7:
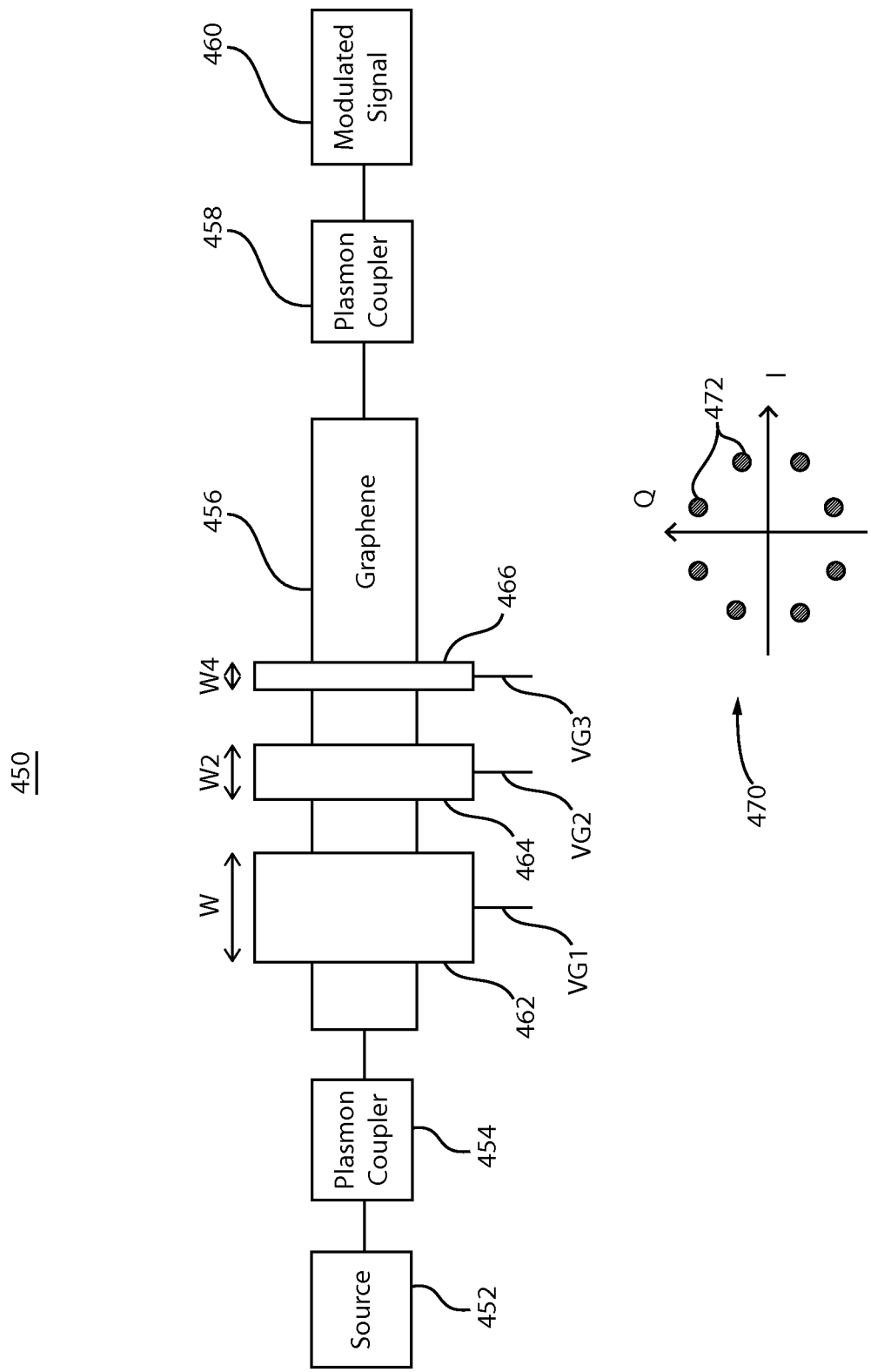
FIG. 7 is a block/flow diagram showing a system for modulating a signal using a plasmonic channel/link and a gate field in accordance with another embodiment.

Referring to FIG. 7, communication links in accordance with the present principles may include a plurality of variations and applications. In one embodiment, gate structures 462, 464, 466 may be formed over a plasmonic conductive layer 456 between plasmonic couplers 454, 458. The gate structures 462, 464, 466 may include different widths W, which are sized to adjust modulation of signals carried by the plasmonic conductive layer 456 from a data source 452 to a modulated signal 460. A plurality of modulating schemes is contemplated including amplitude modulation, phase modulation, frequency modulation, etc. In the example, a phase (or amplitude modulation scheme is illustratively shown through use of a gate field.

In one embodiment, the plasmonic conductive layer 456 includes graphene channel, and phase and/or amplitude modulation within a communication link 450 may include the following. A gate 462 or gated area of width W is defined over the graphene channel (456). A gate dielectric (between the gate material 456 and the graphene channel 456 (not shown)) and a gate voltage (VG1) are designed such that when VG1 changes its value (from 0 to 2V, for example), the plasmonic signal along the graphene channel 456 experiences a phase shift of 180 degrees. If the same phase modulation action is applied to a gated area 464 of width W/2 with gate voltage, VG2, the phase shift will be 90 degrees, and likewise 45 degrees for the gated area 466 with a width of W/4 using gate voltage, VG3. While the present example includes three gates, multiple gate areas of subsequently narrower (or broader) widths can be defined to encode more bits or as needed. The structure of the communication link 450 can function, e.g., as an 8-PSK modulator with 3 bits and 2^3=8 possible phases as illustratively depicted in constellation 470 with 8 in-phase (I)/quadrature (Q) constellation points 472. At the same time, gate 462 (W) can be used to modulate the amplitude of a transmitted signal.

In the example, a width (W) to change the phase by it can be estimated. As a signal propagates distance W along the link 456, its phase is changed by $q_1 W$, where $q_1$ is the plasmon wavevector, $q_1 \propto v^2/n_1^{1/2}$, as described above. When we modify VG1 by 2 Volts, the carrier density (n) will be modified by $dn=C_g dVg$ where dn is the change in carrier density, $C_g$ is gate capacitance and dVg is the change in gate voltage. For an oxide thickness of 5 nm of $SiO_2$ for a gate dielectric, gate capacitance $C_g=7\times10^{-3}$ F/m$^2$. This would give dn=8.8× $10^{12}$ cm$^{-2}$.

If the original carrier density were $n_1=4.4\times10^{12}$ cm$^{-2}$, then after the voltage has been applied, a new wavevector becomes $q'_1=0.57\ q_1$. To modulate phase by $\pi$, we need to choose $W=\pi/(q_1-q'_1)=7.4/q_1$. For a frequency of interest $v=1$ THz, we find $q_1=73$ mm$^{-1}$, and, therefore, $W=100$ μm. Note that the numbers presented here are for illustrative purposes and should not be construed as limiting.

For the carrier mobility of up to 5000 cm$^2$/Vs, the losses after propagating distance W may make phase modulation challenging. However, with adequate carrier mobility and layer quality, phase modulation may be implemented.

To make phase modulation practical, a high mobility is also needed such that amplitude does not change much over the distance W. For the example above, to get $q_2 W \sim 1$, where $q_2$ is defined above, mobility on the order of 50,000 cm$^2$/Vs is needed.

For the amplitude modulation, we can modify the gate to change $q_2$, such that the amplitude would be modified by $\exp(-(q_2-q'_2)W)$, where $q_2 \propto 1/n$ and $q'_2 \propto 1/(n+dn)$. Other structures and schemes are also contemplated.

Figure 8:
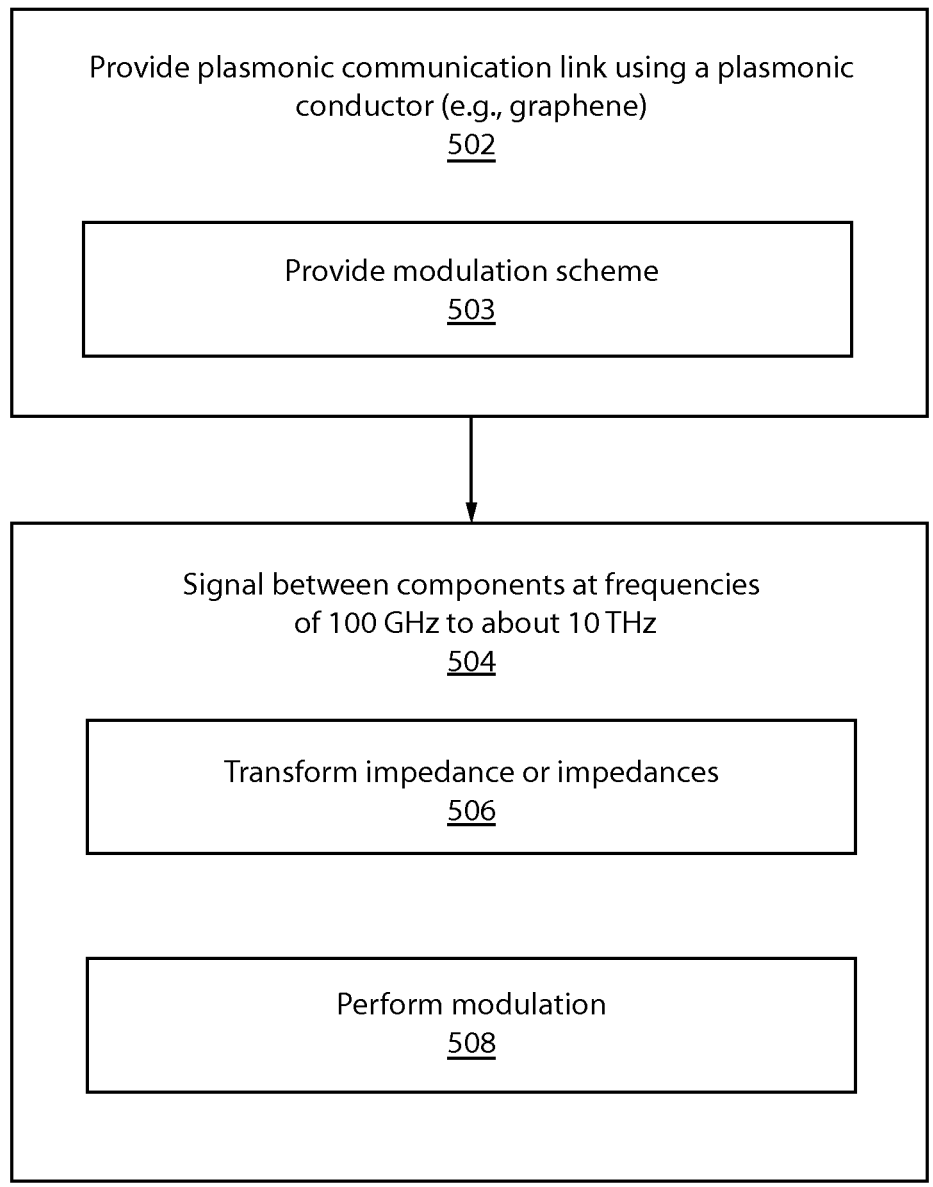
FIG. 8 is a block/flow diagram showing a method for high frequency signal transfer in accordance with one illustrative embodiment.

Referring to FIG. 8, a method for high frequency signaling/communication is illustratively shown. It should also be noted that, in some alternative implementations, the functions noted in the blocks may occur out of the order noted in FIG. 8. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In block 502, a plasmonic signal transfer link is provided. This includes a first plasmonic coupler and a second plasmonic coupler spaced apart from the first plasmonic coupler to form a gap. The couplers are formed on an insulator by deposition of and patterning of a metal or other conductive material. The metal may be patterned using known lithographic techniques to provide the desired dimensions for the couplers. An insulator layer may be formed over end portions of the first and second plasmonic couplers and over the gap. In an alternate embodiment, the insulator layer is formed first and the couplers are formed on the insulator layer by deposition and patterning.

A plasmonic conductive layer is formed over the gap on the insulator layer (opposite the couplers). The plasmonic conductive layer is configured and dimensioned to excite plasmons to provide a signal transmission between the first and second plasmonic couplers. The plasmonic conductive layer preferably includes one or more monolayers of graphene. The link may be configured to be flexible and/or transparent. The plasmonic conductive layer may also include a metal grating.

In block 503, an optional modulation scheme is designed and implemented by designing and sizing gates to modulate signals as needed, for example, phase or amplitude modulation.

In block 504, signaling between a first component coupled to the first plasmonic coupler and a second component coupled to the second plasmonic coupler is performed. The signaling is preferably at a frequency between about 100 GHz and 10 THz. The signaling may be between components on a same chip, between chips, between vertically stacked chips, between stacks of chips, between other components or any combination thereof. In block 506, at least one impedance transformation is performed before or after the link to adjust impedance for signal transfer to optimize operation. In block 508, modulation may be performed for transmission and/or of receiving signals during operation.

Having described preferred embodiments for a graphene plasmonic communication link (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A signal transfer link, comprising:
a first plasmonic coupler;
a second plasmonic coupler spaced apart from the first plasmonic coupler to form a gap;
an insulator layer formed over end portions of the first and second plasmonic couplers and in and over the gap;
a plasmonic conductive layer formed over the gap on the insulator layer to excite plasmons to provide signal transmission between the first and second plasmonic couplers; and
at least one gate structure present over the plasmonic conductive layer that provides a gate field for modulating the signal transmission in the signal transfer link, wherein changing a gate area of the at least one gate structure causes a phase shift in the signal transmission.

2. The link as recited in claim 1, wherein the plasmonic conductive layer includes graphene.

3. The link as recited in claim 1, wherein the first and second plasmonic couplers include nano-antennae.

4. The link as recited in claim 1, wherein the link includes a communication link between at least two components on an integrated circuit chip.

5. The link as recited in claim 1, wherein the link includes a communication link between at least two integrated circuit chips.

6. The link as recited in claim 1, further comprising at least one impedance transformation component to adjust impedance for signal transfer.

7. The link as recited in claim 1, wherein the link is flexible.

8. The link as recited in claim 1, wherein the link is visibly transparent.

9. The link as recited in claim 1, wherein the link provides data transfer at a rate of between 100 GHz and 10 THz.

10. The link as recited in claim 1, wherein the plasmonic conductive layer includes a metal grating.

11. A signal transfer link, comprising:
a first plasmonic coupler;
a second plasmonic coupler disposed in a same plane as the first plasmonic coupler and spaced apart from the first plasmonic coupler by a gap;
an insulator layer formed over end portions of the first and second plasmonic couplers and in and over the gap, the insulator having a thickness configured to prevent electrical connection between the first and second plasmonic couplers;
a plasmonic conductive layer including graphene formed over the gap on the insulator layer and overlapping the end portions of the first and second plasmonic couplers such that an electrical signal from one of the first and second plasmonic couplers is converted to a plasmonic signal in the plasmonic conductive layer; and
at least one gate structure present over the plasmonic conductive layer that provides a gate field for modulating the plasmonic signal in the signal transfer link, wherein changing a gate area of the at least one gate structure causes a phase shift in the plasmonic signal.

12. The link as recited in claim 11, wherein the plasmonic signal is then converted back to an electrical signal in the other of the first and second plasmonic couplers.

13. The link as recited in claim 11, wherein the link includes a communication link between at least two components on an integrated circuit chip.

14. The link as recited in claim 11, wherein the link includes a communication link between at least two integrated circuit chips.

15. The link as recited in claim 11, further comprising at least one impedance transformation component to adjust impedance for signal transfer.

16. The link as recited in claim 11, wherein the link is flexible and visibly transparent.

17. The link as recited in claim 11, wherein the link includes a gate field, wherein the gate field is selectively enabled to modulate a signal in the link.

18. The link as recited in claim 11, wherein the link provides data transfer at a rate of between 100 GHz and 10 THz.

* * * * *